United States Patent
Banerjee et al.

(10) Patent No.: US 10,088,616 B2
(45) Date of Patent: Oct. 2, 2018

(54) PANEL WITH REDUCED GLARE

(71) Applicants: Toyota Motor Engineering & Manufacturing North America, Inc., Erlanger, KY (US); The Regents of the University of Michigan, Ann Arbor, MI (US)

(72) Inventors: Debasish Banerjee, Ann Arbor, MI (US); Lingjie Jay Guo, Ann Arbor, MI (US); Kyu-Tae Lee, Ann Arbor, MI (US)

(73) Assignees: Toyota Motor Engineering & Manufacturing North America, Inc., Plano, TX (US); The Regents of the University of Michigan, Ann Arbor, MI (US)

( * ) Notice: Subject to any disclaimer, the term of this patent is extended or adjusted under 35 U.S.C. 154(b) by 882 days.

(21) Appl. No.: 14/491,519

(22) Filed: Sep. 19, 2014

(65) Prior Publication Data
US 2016/0085008 A1    Mar. 24, 2016

(51) Int. Cl.
*G02B 5/30* (2006.01)
(52) U.S. Cl.
CPC ................. *G02B 5/3058* (2013.01)
(58) Field of Classification Search
CPC .................................................. G02B 5/3058
USPC .......................... 359/485.05, 487.03, 488.01
See application file for complete search history.

(56) References Cited

U.S. PATENT DOCUMENTS

| | | | |
|---|---|---|---|
| 5,486,949 A | 1/1996 | Schrenk et al. | |
| 5,817,396 A | 10/1998 | Perlo et al. | |
| 6,122,103 A | 9/2000 | Perkins et al. | |
| 6,590,695 B1 * | 7/2003 | Kurtz | G02B 5/3058 359/245 |
| 7,106,507 B2 | 9/2006 | Lee et al. | |
| 7,113,335 B2 | 9/2006 | Sales | |
| 7,158,302 B2 | 1/2007 | Chiu et al. | |
| 7,768,018 B2 | 8/2010 | Smirnov et al. | |
| 7,791,807 B2 | 9/2010 | Pasca et al. | |
| 7,813,039 B2 | 10/2010 | Perkins et al. | |
| 7,961,393 B2 | 6/2011 | Perkins et al. | |
| 8,027,087 B2 | 9/2011 | Perkins et al. | |
| 8,611,007 B2 | 12/2013 | Davis | |
| 8,947,772 B2 * | 2/2015 | Gardner | G02B 5/3058 359/352 |

(Continued)

FOREIGN PATENT DOCUMENTS

| | | |
|---|---|---|
| CN | 103197368 A | 7/2013 |
| WO | 2006035389 A1 | 4/2006 |
| WO | 2013081162 A1 | 6/2013 |

*Primary Examiner* — Ricky D Shafer
(74) *Attorney, Agent, or Firm* — Dinsmore & Shohl LLP

(57) ABSTRACT

A wire-grip polarizer ("WGP"), and a panel having said WGP is provided. The WGP is mounted on an absorption layer. The absorption layer is mounted on a substrate. The substrate is brightly colored. The WGP includes a plurality of gratings formed of a metallic element. Each of the gratings is spaced apart from the other so as to form a waveguide. The WGP is configured to transmit S-Polarized light and reflect P-polarized light. The A thin film layer may be disposed on each of the metallic gratings. The thin film layer is configured to generate a resonance so as to modify the reflectivity of P-polarized light so as to reduce veiling glare and maintain the brightness of the substrate.

12 Claims, 7 Drawing Sheets

(56) References Cited

U.S. PATENT DOCUMENTS

| | | | |
|---|---|---|---|
| 9,684,203 B2* | 6/2017 | Nielson | G02F 1/133536 |
| 2002/0122235 A1* | 9/2002 | Kurtz | H01Q 15/24 |
| | | | 359/254 |
| 2004/0008416 A1* | 1/2004 | Okuno | G02B 5/1809 |
| | | | 359/566 |
| 2008/0316599 A1* | 12/2008 | Wang | G02B 5/3058 |
| | | | 359/485.05 |
| 2009/0059368 A1* | 3/2009 | Kamada | B32B 17/10 |
| | | | 359/489.01 |
| 2009/0168170 A1 | 7/2009 | Huang et al. | |
| 2010/0134719 A1 | 6/2010 | Johns et al. | |
| 2012/0075830 A1 | 3/2012 | Lee et al. | |
| 2012/0160802 A1 | 6/2012 | Kim et al. | |
| 2013/0286358 A1* | 10/2013 | Takahashi | G02B 5/3058 |
| | | | 353/20 |
| 2013/0321915 A1 | 12/2013 | Chien et al. | |
| 2015/0015948 A1* | 1/2015 | Takada | G02B 5/3058 |
| | | | 359/485.05 |

* cited by examiner

PANEL WITH REDUCED GLARE

TECHNICAL FIELD

A colored panel having a wire-grid polarizer configured to reduce veiling glare and maintain the brightness of the panel and a wire-grid polarizer is provided.

BACKGROUND OF THE INVENTION

Veiling glare are mirror-like images of an object projected onto a window. The mirror-like image is caused when light is transmitted through a window onto the object. The light reflects off the object onto the inner surface of the window.

Veiling glare is a phenomenon which is commonly observed inside an automotive vehicle. In particular, light penetrates the windshield and strikes the dashboard, the dashboard ("D") reflects the light onto the interior surface of the windshield ("W') as depicted in FIG. 1. Thus, what is superimposed onto the windshield is a mirror image of the dashboard. The mirror image of the dashboard imposed on the windshield can lower the contrast of road scene.

With reference now to FIG. 2, a perspective view showing the relationship between incident angles and reflectance from the panel seen on the windshield "W" of an automotive vehicle is provided. The windshield "W" is angled with respect to the dashboard "D". The dashboard "D" is shown disposed on a generally horizontal plane. The windshield "W" may be angled 20 to 40 degrees with respect to the dashboard "D". The driver's eye is indicated by "DE" and the reflections from the dashboard "D" are indicated by the uniform and dashed lines.

FIG. 2 illustrates that lights enters the driver's eye from both above and below the driver's field of view. In such a windshield "W" and dashboard "D" configuration, angles $\phi_1$ and $\phi_2$ $\phi_2$ are the angles between the dashboard "D" and the windshield "W", and indicate the directions of light coming from above and below the panel. Both $\phi_1$ and $\phi_2$ have a range of 0 to 25 degrees, and thus, the incident angle of lights that contribute to veiling glare has a range of 40 to 80 degrees.

When the incident angle of lights contributing to veiling glare has a range of 40 to 80 degrees, the reflectivity of P-polarized lights is much lower than that of S-polarized lights at the air-glass boundary by calculating the Fresnel reflection coefficients. A relationship between the power of reflectivity and the incident angles is provided in the chart shown in FIG. 3. The chart is formulated with the assumption that the refractive indexes of the glass/windshield is 1.5 and the refractive index of air is 1.0. Accordingly, reducing veiling glare may be accomplished by controlling the reflectivity of P-polarized lights. With reference again to FIG. 3, it is seen that the reflectivity for P-polarized light vanishes at Brewster's angle.

As is demonstrated in FIGS. 2 and 3, veiling glare is influenced by the reflectance of the dashboard. Thus, veiling glare may be reduced by having a panel which is colored darkly. It is known that darkly colored panels have low-reflectivity, but also absorbed a larger spectrum of light and thus generates heat. Further, such an approach limits the colors which may be offered as bright colored dashboard panels may increase veiling glare. As used herein, "brightly colored" refers to a panel configured to reflect wavelengths having a wavelength between 380-750 nm.

Attempts have been made to reduce veiling glare. Such attempts include the use of an absorbing polarizing layer mounted on top of a reflecting layer. The reflecting layer includes reflective or scattering pigments to increase the brightness of the vehicle interior. However, the brightness is reduced with the absorbing polarizing layer mounted on top thereof.

Accordingly, it remains desirable to have a brightly colored panel configured to reduce veiling glare while maintaining the brightness of its color by utilization of a high reflectivity structure.

SUMMARY OF THE INVENTION

A panel configured to reduce veiling glare off an adjacent window while maintaining the brightness of the color of the panel is provided. A wire-grid polarizer (WGP) configured to reflect P-polarized light in a predetermined spectrum and transmit S-polarized light an all visible spectrum is also provided. The panel may be a dashboard panel disposed adjacent a windshield and positioned so as to receive light through the windshield. The panel includes a substrate, an absorption layer mounted on the substrate and a WGP. The substrate may be colored brightly, thus configured to reflect a wavelength between 380-750 nm. The absorption layer is configured to absorb S-polarized light and P-polarized light, and is mounted on top of the substrate. The WGP is mounted on top of the absorption layer.

The WGP includes a plurality of gratings formed of a metallic element. Each of the gratings is generally an elongated strand of the metallic element, and each are spaced apart from each other so as to form a plurality of wave guides. The waveguides have a width, as measured by the distance between opposing gratings, shorter than the wavelength of the color of the substrate so as to reflect P-polarized light by inducing the dipole radiation, wherein the S-polarized light is transmitted through the substrate by the waveguides formed between the metallic gratings.

The WGP may further include a thin film layer deposited on each of the gratings. The thin film layer is configured to modify the reflectivity spectrum of the metal grating by generating a resonance when coupled to the gratings. Accordingly, a predetermined spectrum of P-polarized light may be reflected off of the WGP. The thin film layer may be formed of a lossy dielectric such as a semiconductor. The semiconductor may have a thickness between 1 to 30 nm so as to reflect the P-polarized light having a wavelength of the color of the substrate.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be better understood when read in conjunction with the following drawings where like structure is indicated with like reference numerals and in which:

FIG. 9b is a chart showing the measured reflectivity for P-polarized light and S-polarized light of a panel having a WGP of the windshield and dashboard of FIG. 9a.

FIG. 10b is an illustration showing the WGP placed to the right of the WGP shown in FIG. 10a.

DETAILED DESCRIPTION OF THE PREFERRED EMBODIMENTS

Figure 1:
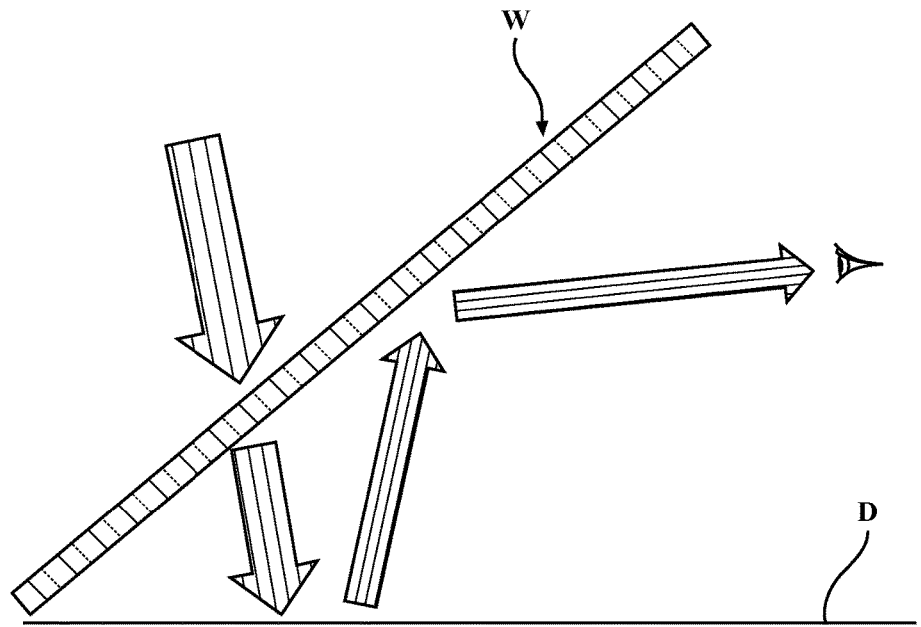
FIG. 1 is a perspective view showing the formation of veiling glare.
Figure 2:
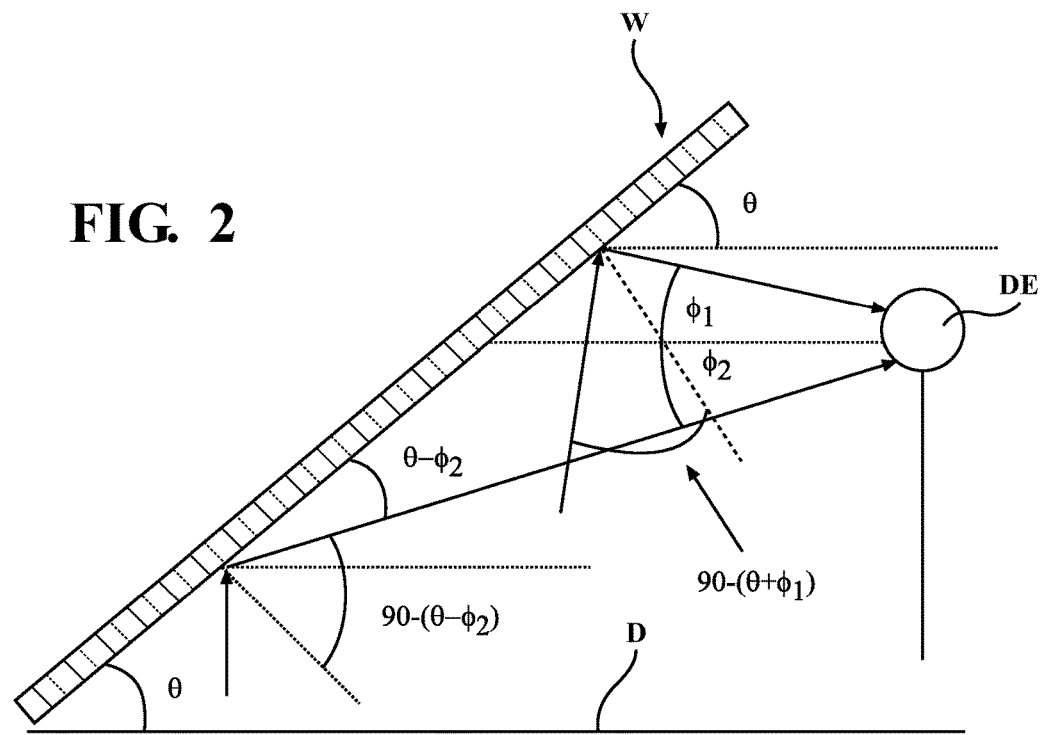
FIG. 2 is a perspective view of showing the relationship between incident angles and reflectance from a panel seen on an adjacent windshield.
Figure 3:
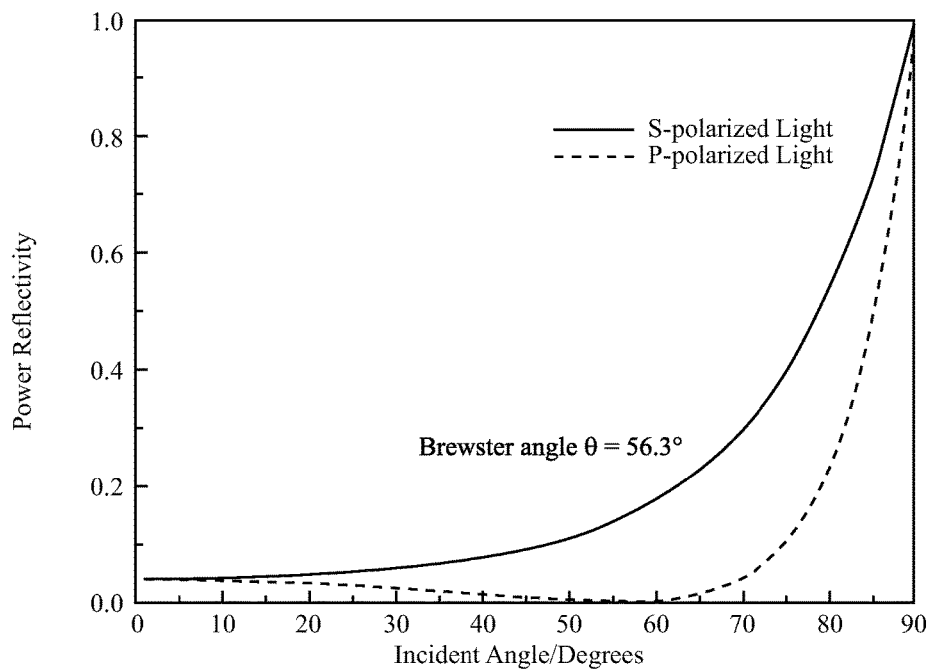
FIG. 3 is a graph showing the relationship between the reflectivity of P-polarized lights and S-polarized lights.

The embodiments described herein generally relate to a brightly colored panel having a WGP so as to reduce veiling glare yet maintain the bright color of the panel. The embodiments described herein also generally relate to a WGP configured to reflect P-polarized light within a predetermined spectrum and absorb all S-polarized light so as to reduce the veiling glare seen on an adjacent reflective surface, yet maintain the color of a brightly colored panel.

The brightly colored panel may be a dashboard disposed adjacent a windshield and positioned so as to receive light through the windshield. The panel further includes a substrate. The substrate may be colored brightly. The panel may further include an absorption layer mounted on the substrate. The WGP is mounted on the absorption layer.

The WGP includes a plurality of gratings formed of a metallic element. Each grating is spaced apart from the other so as to form a plurality of wave guides. The waveguides have a longitudinal axis, the longitudinal axis is axially aligned with the direction of a light source. The metallic gratings and waveguides transmit S-polarized light and reflect P-polarized light of all wavelengths in the visible spectrum.

The WGP further may further include a thin film layer deposited on each of the gratings. The thin film layer is configured to modify the reflectivity spectrum of the metal grating by generating a resonance. The thin film layer modifies the reflectivity spectrum as a function of both the material and thickness of the thin film layer. Thus, both P-polarized and S-polarized light are transmitted to the absorption layer. However, a predetermined spectrum of P-polarized light is reflected from the WGP.

In operation, light passes through the non-polarized windshield and strikes the panel. Specifically, light strikes the WGP which polarizes the light thus generating S-polarized light and P-polarized light. As used herein, and to be consistent with the notions used for glass windows, "S-polarized light" refers to the light polarized along the longitudinal length of the gratings, and "P-polarized light" refers to the light polarized perpendicular to the longitudinal length of the gratings.

The waveguides transmit S-polarized light into the absorption layer. The presence of a thin film layer may change the reflectivity spectrum of the metal grating by generating a resonance when coupled to the gratings, thus transmitting a specific spectrum of P-polarized light, and reflecting a specific spectrum of P-polarized light.

Thus, in instances wherein the brightly colored panel is colored other than white or black, the thin film layer may be configured to generate a resonance to a desired reflectivity wavelength spectrum, wherein the S-polarized and P-polarized light are transmitted into the absorption layer and the P-polarized light in the desired wavelength spectrum is reflected from the WGP so as to maintain the brightness of the color of the substrate. However, if the brightly colored panel is colored white, it may desirable to have a WPG without the thin film layer so as to absorb all the polarized light. As the reflectivity of the S-polarized light is absorbed, the veiling glare is reduced as the P-polarized light passes through the windshield and is not reflected from the windshield into the driver's field of view. Accordingly, the panel and the WGP are configured to reduce veiling glare while maintaining the brightness of the color of the panel.

Figure 4:
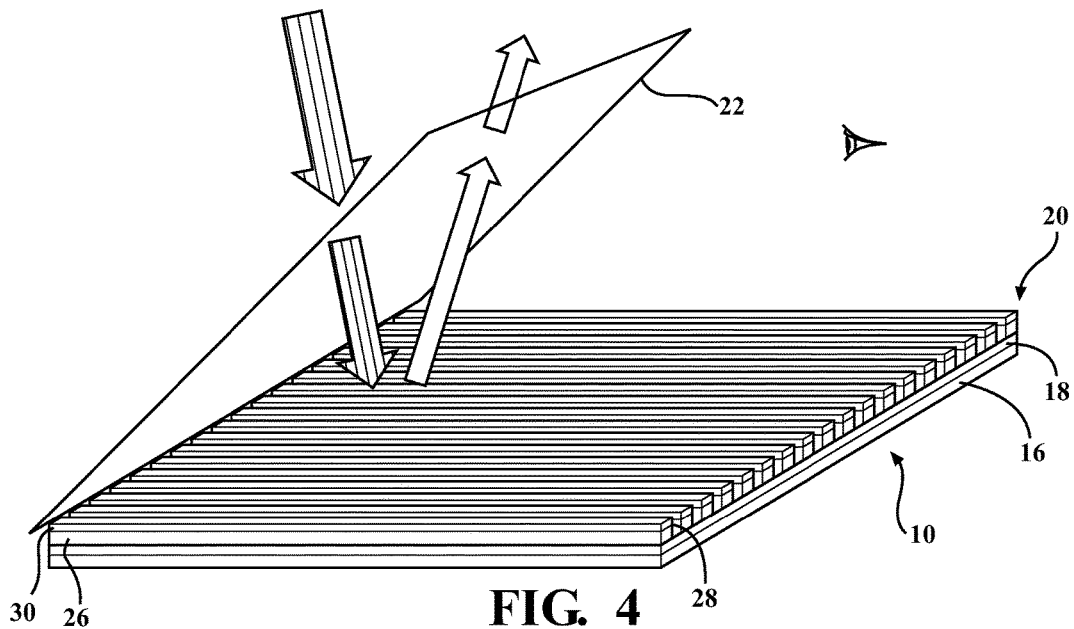
FIG. 4 is a perspective view showing the panel used to reduce veiling glare from an adjacent windshield.
Figure 8:
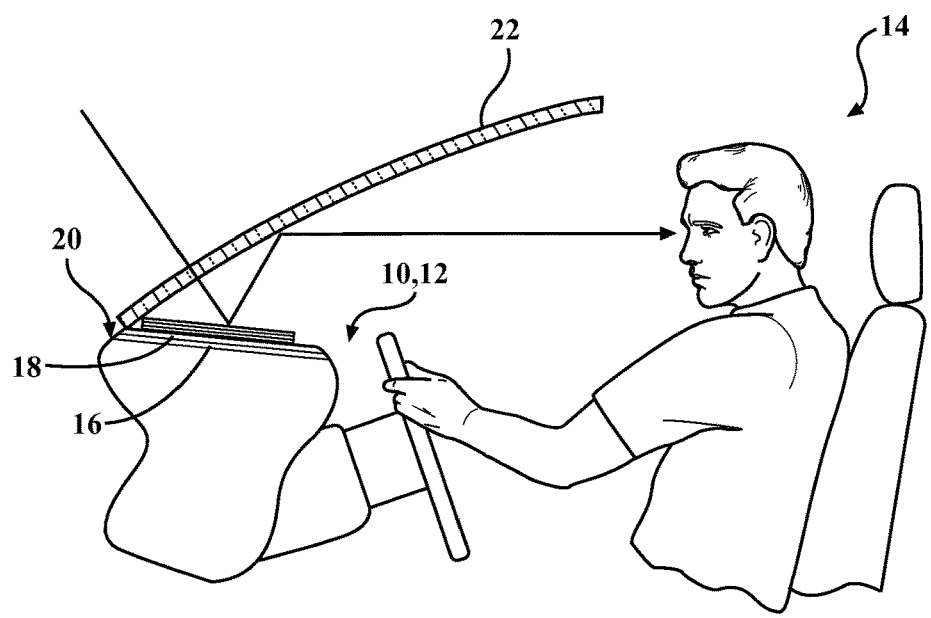
FIG. 8 is a cross-sectional view of an automotive vehicle showing the panel and windshield arrangement.

With reference now to FIG. 4, an illustrative embodiment of the panel 10 is provided. The panel 10 is generally planar, and is shown disposed along a generally horizontal plane. The panel 10, may be a dashboard 12 for use in an automotive vehicle 14 (as shown in FIG. 8). The panel 10 includes a substrate 16, an absorption layer 18 mounted on the substrate 16 and a WGP 20 mounted on the absorption layer 18.

As shown in FIG. 4, light from the exterior of the windshield 22 passes through the windshield 22 and is reflected onto the interior side of the windshield 22. As light strikes the WGP 20, the light is polarized, wherein S-polarized light is transmitted into the absorption layer 18. The panel 10 may be further configured to reflect P-polarized light in a predetermined spectrum so as to maintain the brightness of the colored panel 10. The P-polarized light is transmitted through the windshield 22 (as indicated by the arrow) so as to reduce veiling glare.

The substrate 16 may be formed of a polyurethane, or a composite of unsaturated polyester resin, vinylester resin, and rubber, or the like. The substrate 16 is brightly colored-reflecting a wavelength(s) between 380-750 nm. The absorption layer 18 is made of a material configured to absorb the S-polarized and P-polarized light that transmitted through the WGP 20. Any material configured to absorb light in the visible spectrum currently known and used in the art may be adapted for use herein, illustratively including semiconductor, silicide, metal, or metal alloys or a material coated with black chromium, carbon black, or the like.

Figure 5:
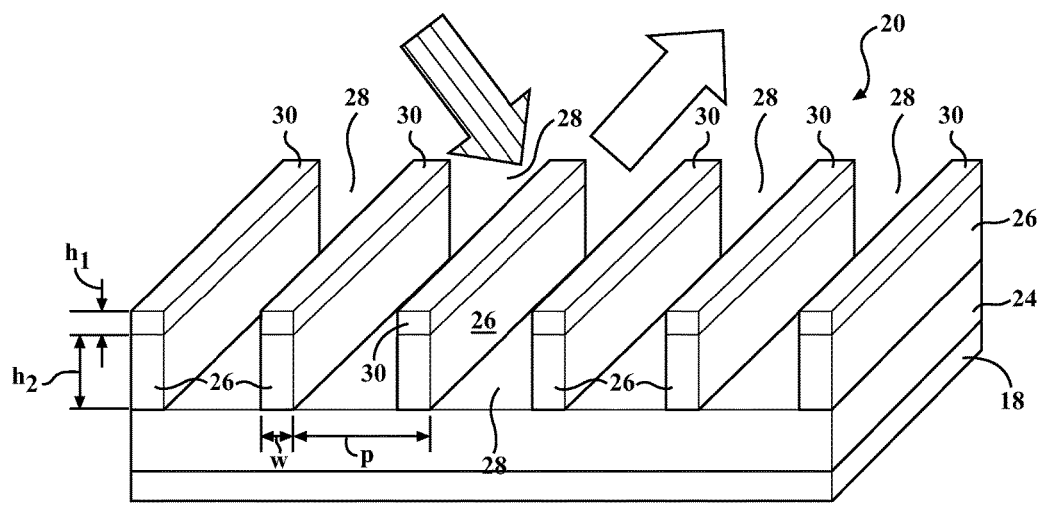
FIG. 5 is an isolated view of the WGP shown in FIG. 4.

With reference now to FIG. 5, an illustrative embodiment of the WGP 20 is provided. The WGP 20 is mounted on the absorption layer 18. The WGP 20 may include a second substrate 24 to provide structural support. The second layer 24 may be formed of glass. The second substrate 24 may be mounted onto the absorption layer 18 or formed integral with the absorption layer 18.

The WGP 20 includes a plurality of metallic gratings 26. The gratings are formed of a metallic element configured to induce surface plasmon. Any metallic element, to include a metallic composition, may be adapted for use herein to include aluminum, chromium, copper, silver, gold, platinum, zinc, and tungsten and alloys of them. Each of the gratings 26 are generally elongated strands of a metallic element and extend longitudinally along axis "X" so as to define the length of the WGP 20. The gratings 26 have a thickness ("$h_2$") which is sub-wavelenth, e.g. less than the wavelength of light. The width ("$w_1$") of the gratings 26 are also sub-wavelength and shorter than the thickness ("$h_2$") of the grating 26. The grating period, as measured by the distance between respective first surfaces ("$f_1$") of adjacent metallic gratings 26 is sub-wavelength.

The metallic gratings 26 are spaced apart from each other so as to define a plurality of waveguides 28 disposed between adjacent gratings 26. The width ("$w_2$") of the waveguides 28, as measured between by the distance between adjacent gratings 26, is shorter than half of the light wavelength. Further, the waveguides 28, and consequently the gratings 26 extend axially along axis "X" and may be aligned with the light source. The waveguides 28 and gratings 26 may angled up to 70 degrees from the direction of the light source. Namely, the waveguides have a width shorter than the half of the wavelength of visible light. The S-polarized and P-polarized light is transmitted through the sub-wavelength metallic grating into the waveguide, and S-polarized and P-polarized light is directed into the absorption layer 18 so as to reduce veiling glare.

The WGP 20 further may include a thin film layer 30. The thin film layer 30 is formed of a material with light absorbing property, such as a semiconductor or metals configured to create a resonance. It should be appreciated that the materials for manufacturing a semiconductor and metals creating a resonance currently known and used in the art may be adapted for use herein, illustratively including a lossy dielectric, a silicide, metal or metal alloys. Such materials include amorphous silicon, chromium, amorphous silicon, germanium, zinc selenide, zinc sulfide and Tungsten. The thin film layer 30 is disposed on each of the gratings 26. The thin film layer 30 may have a width ("$w_3$") equal to the width ("$w_1$") of the grating 26 the thin film layer 30 is deposited on.

The thin film layer 30 is configured to create the resonance in the reflection spectrum of the P-polarization so as to maintain the brightness of the brightly colored substrate 16. Thus, in instances where the brightly colored panel is colored blue, the thin film layer is configured to reflect P-polarized light having a wavelength between approximately 450-495 nm and absorb the remaining P-polarized. Alternatively, in cases where the panel is colored white, the WGP does not include a thin film layer and thus no resonance with the metallic gratings 26 is generated resulting in the reflection of P-polarized light in the entire visible spectrum whereas S-polarized light is transmitted to the absorption layer 18.

Figure 6:
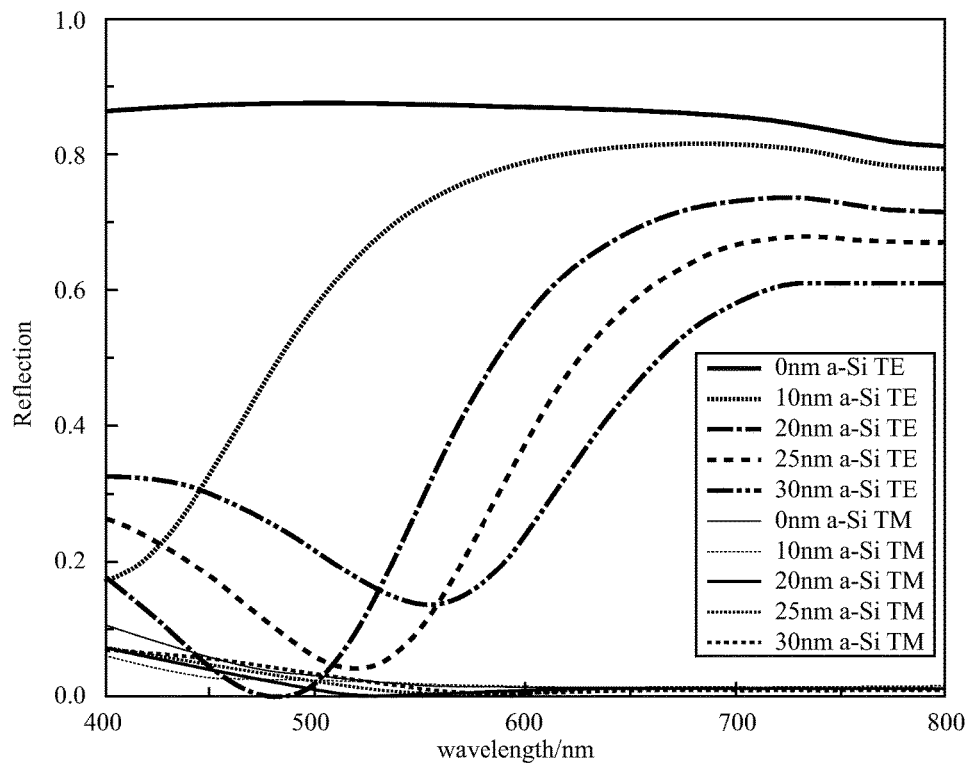
FIG. 6 is a graph showing the simulated reflectance of P-polarized light and S-polarized light of a WGP with thin film layers having various thickness.

The thickness ("$h_1$") and material of the thin film layer 30 may be modified to reflect the wavelength of the color of the panel 10. For instance, the thickness ("$h_1$") of a thin film layer 30 made of amorphous silicon may be between 1 and 30 nm depending upon the wavelength reflection desired. It should be appreciated that the thickness ("$h_1$") is measured by the distance between a bottom surface and a top surface of the thin film layer 30. As shown in FIG. 6, the thickness ("$h_1$") and material affects the resonance generated and thus the reflectivity of the thin film layer 30. Accordingly, the thickness of the thin film layer 30 is based in part upon the reflectivity desired.

With reference again to FIG. 5, the metallic gratings 26, waveguides 28 and thin film layer 30 are shown illustratively disposed on second substrate 24, and the second substrate 24 is disposed on the absorption layer 18. However, it should be appreciated that the WGP 20 may be configured so as to have the metallic gratings 26, waveguides 28 and thin film layer 30 disposed directly on the absorption layer 18. In such an embodiment the WGP 20 will not require a second substrate 24. For instance, the metallic gratings 26, waveguides 28 and thin film layer 30 may be encapsulated by an elastic polymer such as polydimethylsiloxane ("PDMS") and mounted directly on the absorption layer 18.

With reference now to FIG. 6, a chart showing the reflection spectra of S-polarized and P-polarized light at normal incident angle, having a wavelength from 400 nm to 800 nm is provided. The simulation was based upon the reflectivity of a WGP 20, shown in FIG. 5, having a grating 26 made of aluminum, and a thin film layer 30 made of amorphous silicon, ("a-Si"). The WGP 20 has a grating period ("p") of 180 nm, the grating 26 and the thin film layer 30 have the same width ("w") of 60 nm, and the thickness of the grating 26 ("$h_2$") is 200 nm. The simulation was conducted varying the thickness ("$h_1$") of the thin film layer 30. Specifically, the simulation was conducted with thin film layer 30 thicknesses of 0, 10, 20, 25 and 30 nm.

The solid lines represent the reflection of P-polarized light and the dashed lines represent the reflection of S-polarized light. FIG. 6 demonstrates that the reflection of the S-polarized light remains relatively unchanged in that nearly all of the S-polarized light is transmitted to the absorption layer 18 underneath the WGP 20. However, noticeable differences occur in the reflection of P-polarized light with respect to the thickness of the thin film layer 30. FIG. 6 also shows that the reflectivity of P-polarized light in the entire visible spectrum remains relatively high (nearly 0.9) without the presence of a thin film layer 30. FIG. 6, validates the concept of the reflectivity spectrum modified by the resonance generated by the thin film layer 30.

Figure 7A:
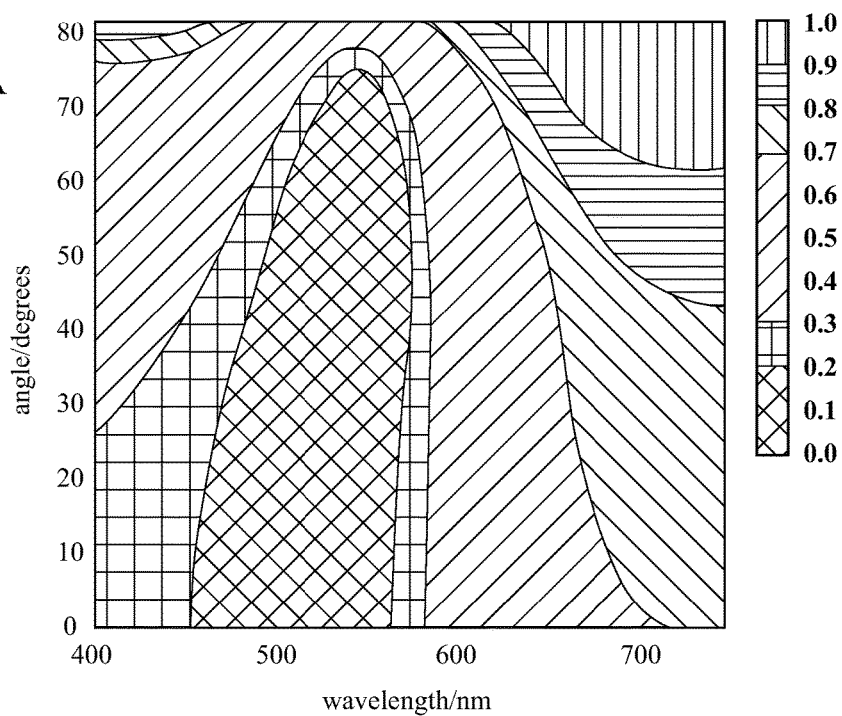
FIG. 7a is a chart showing the simulated reflectivity of P-polarized light from a WGP at different angles.
Figure 7B:
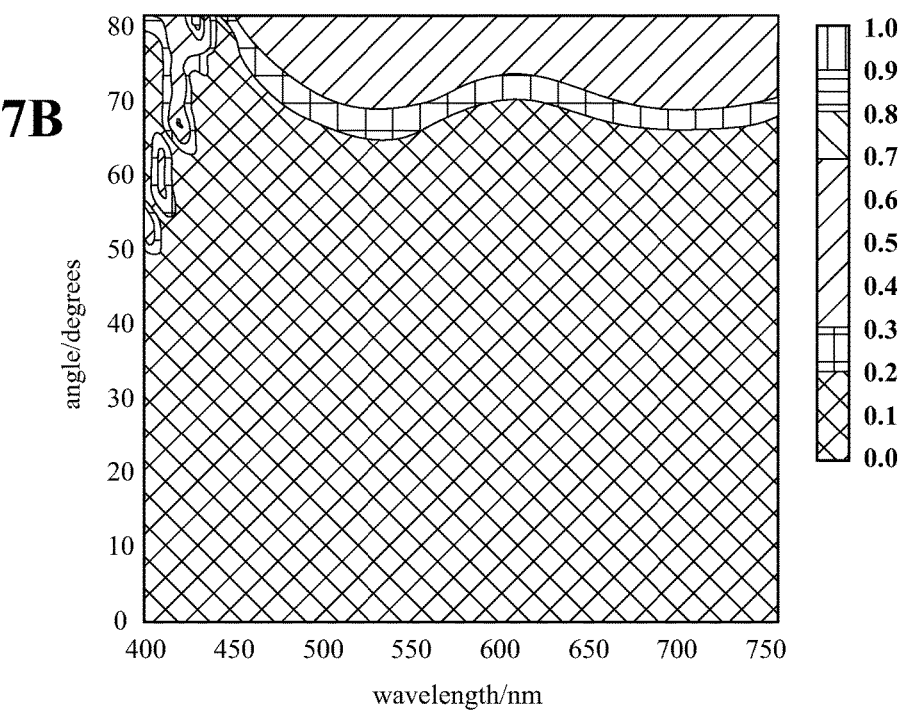
FIG. 7b is a chart showing the simulated reflectivity of S-polarized light from a WGP at different angles.

With reference now to FIGS. 7a, and 7b charts showing the relationship between the viewing orientation of the WGP 20 and its reflection are provided. The simulation was conducted using a WGP 20 having a grating 26 made of aluminum, and a thin film layer 30 made of a-Si. The WGP 20 has a grating period ("p") of 180 nm. The grating 26 and the thin film layer 30 have the same width ("w") of 60 nm. The thickness of the grating 26 ("$h_2$") is 200 nm and the thickness ("$h_1$") of the thin film layer 30 is 25 nm. A legend showing the value of reflectivity accompanies each of FIGS. 7a and 7b. The "Y" column provides the viewing angle, and the "X: axis provides the wavelength. FIGS. 7a and 7b show that the reflectivity and absorption of P-polarized light and S-polarized light, respectively, remains relatively unchanged up to ±70 degrees of the viewing angle. Thus, when used in a space such as the cabin space of a vehicle, the color of the panel 10 will remain fairly constant when viewed from different angles within the car, such as the driver seat and the passenger seat.

With reference now to FIG. 8, an automotive vehicle 14 having a windshield 22 adjacent the dashboard 12 is provided. The windshield 22 is an unpolarized medium for which light may pass. The windshield 22 may be angled between 25 to 35 degrees with respect to the dashboard 12. Light is transmitted through the windshield 22 onto the dashboard 12 and reflected from the dashboard 12 onto an interior surface of the windshield 22.

The dashboard 12 includes a substrate 16, an absorption layer 18 mounted on the substrate 16, and a WGP 20 mounted on the absorption layer 18. The substrate 16 may be colored brightly. The substrate 16 may be formed of material currently known and used in the art, such as polymeric materials containing chromophores or colored pigment. The absorption layer 18 is configured to absorb S-polarized light. The substrate 16 is brightly colored, and may be formed of a polyurethane, or a composite of unsaturated polyester resin, vinylester resin, and rubber, or the like. The substrate 16 is brightly colored-reflecting a wavelength(s) between 380-750 nm. The absorption layer 18 may be formed of black colored materials and is configured to absorb light, illustratively including organic pigments or inorganic pigments configured to absorb visible bands of light.

The WGP 20 may include a second substrate 16 formed of glass. The second substrate 16 may be mounted onto the absorption layer 18 or formed integral with the absorption layer 18. The WGP 20 includes a plurality of gratings 26 formed of a metallic element. The gratings 26 are spaced apart from each other so as to form a waveguide 28. The waveguides 28 transmit S-polarized light and reflect P-polarized light. Thus, if the substrate 16 is colored white, the P-polarized light across the visible spectrum is reflected by the WGP 20.

Each of the gratings 26 extend longitudinally so as to define the length of the WGP 20. The gratings 26 have a thickness ("$h_2$") less than the wavelength of a predetermined hue. Namely, the thickness ("$h_2$") of the gratings 26 is less than the wavelength of the color of the substrate 16. The gratings 26 have a width ("$w_1$") less than its thickness ("$h_2$"). The gratings 26 are formed of a metallic element configured to induce a dipole moment and therefore re-radiate the light wave that has the electric field parallel to the gratings (i.e., p-polarization). Any metallic element, to include a metallic composition may be adapted for use herein to include aluminum or of aluminum, chromium, copper, silver, gold, platinum, zinc, and tungsten and alloys of them.

The waveguides 28 have a longitudinal axis, the longitudinal axis is axially aligned with the direction of a light source, and may angled up to 70 degrees from the direction of the light source. The width ("$w_2$") of the waveguides 28, as measured between by the distance between adjacent gratings 26, is shorter than the wavelength of a predetermined hue, namely, the color of the substrate 16. The metallic grating 26 is configured to for waveguide that transmit the S-polarized light into the absorption layer 18 so as to reduce veiling glare.

In instances where the substrate 16 is colored, other than white or black, the WGP may further include a thin film layer 30 disposed on each of the metallic gratings 26. The thin film layer 30 is configured to generate a resonance so as to modify the reflectivity spectrum wherein the WGP may reflect P-polarized light having a desired wavelength, or within a desired spectrum. The width ("$w_3$") of the thin film layer 30 is preferably the same as the width ("$w_1$") of the grating 26 upon which the thin film layer 30 is deposited on. The thin film layer 30 is formed of a material, such as a semiconductor, configured to create a resonance so as to produce the desired colors for P-polarized light depending on the thickness of thin film layer. It should be appreciated that the material currently known and used in the art may be adapted for use herein, illustratively including amorphous silicon.

The thin film layer 30 is disposed on each of the gratings 26 and may have a thickness ("$h_1$") between 1 and 30 nm, and is configured to reflect P-polarized light having a wavelength the same length as the colored substrate 16. Thus, the thin film layer 30, by reflecting P-polarized light in the same visible spectrum as the colored substrate 16, maintains the brightness of the brightly colored substrate 16. As shown in FIG. 6, the thickness ("$h_1$"), as measured by the distance between a bottom surface and a top surface of the thin film layer 30 affects the reflectivity of the WGP 20. Accordingly, the thickness ("$h_1$") of the thin film layer 30 is based in part upon the reflectivity desired.

Figure 9A:
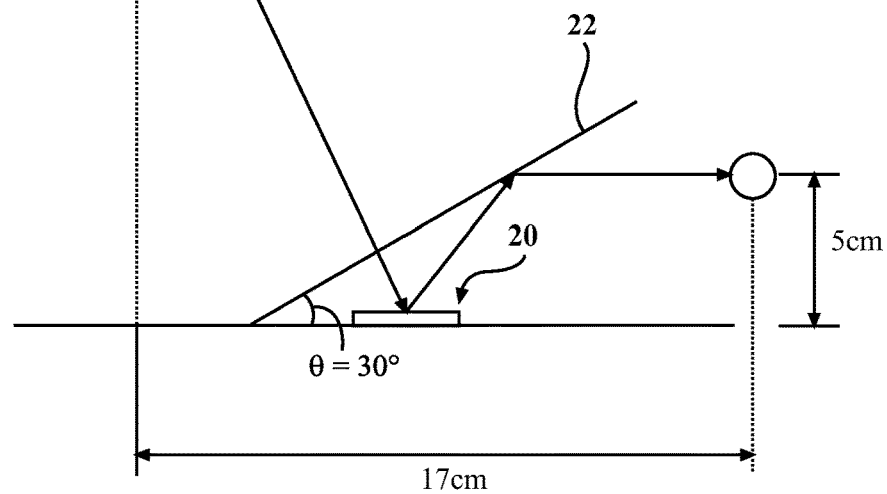
FIG. 9a is a perspective view showing the measurement of reflectivity of the windshield and dashboard having a WGP.

With reference now to FIG. 9a, a diagram of a windshield 22 and dashboard 12 model is provided to verify the simulation results set forth in FIG. 6. The Windshield 22 is angled 30 degrees with respect to the dashboard 12. A WGP 20 is placed on the dashboard 12 and a measurement of the reflectivity of P-polarized and S-polarized lights was taken at different orientations of the WGP 20. The WGP 20 has a metallic grating 26 formed of aluminum and has a reflectivity of approximately 45% for un-polarized visible lights, namely light passed through the windshield 22 striking the WGP 20.

The WGP 20 has a grating period ("p") of 180 nm, the grating 26 and the thin film layer 30 have the same width ("w") of 60 nm, and the thickness of the grating 26 ("$h_2$") is 200 nm. The simulation was conducted without a thin film layer 30. An LED light was hung in front of the windshield 22 to mimic the ambient light. A spectrometer was placed behind the windshield 22 and suspended 5 cm above the dashboard 12.

Figure 9B:
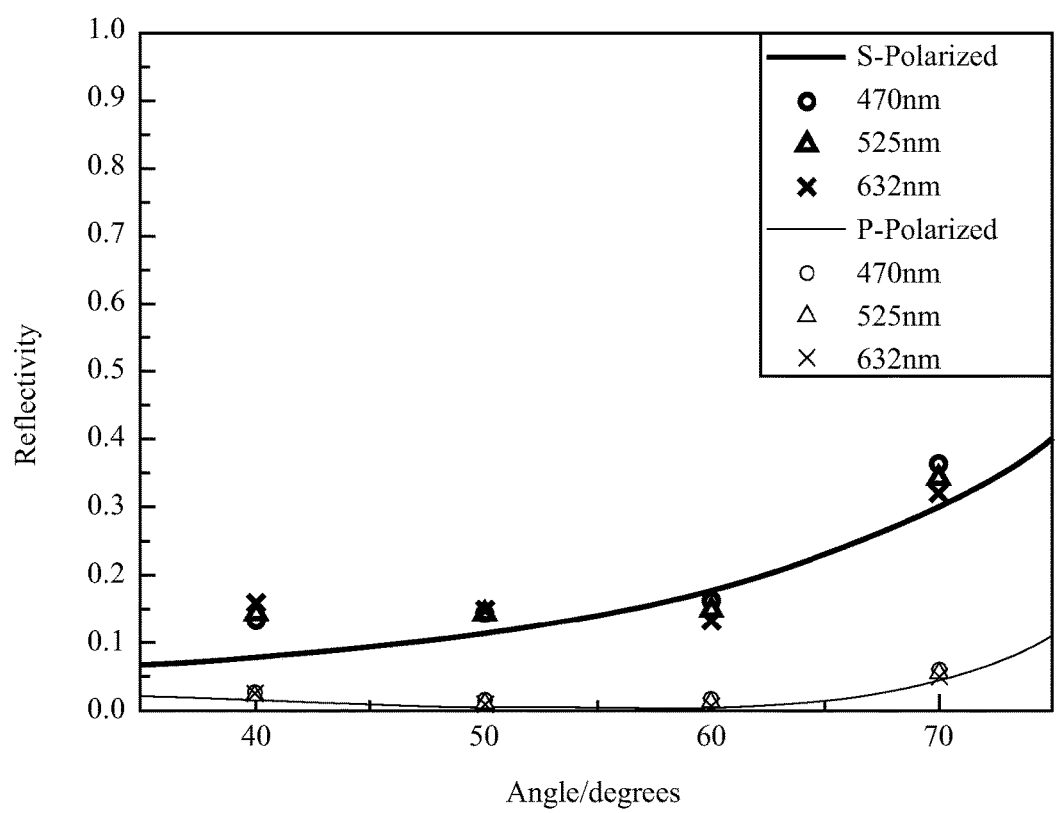

With reference now to FIG. 9b, the results of the model shown in FIG. 9a are provided. FIG. 9b is a chart which shows the reflections for both P-polarized and S-polarized lights, measured at four different incident angles. The incident angles where achieved by changing the positions of both the LED light source and the polarizer. The solid lines correspond to the theoretical prediction and the symbols (circle, triangle, and cross) are taken from measurement results for three particular wavelengths. The physical results validate the simulation results shown in FIG. 6.

Figure 10A:
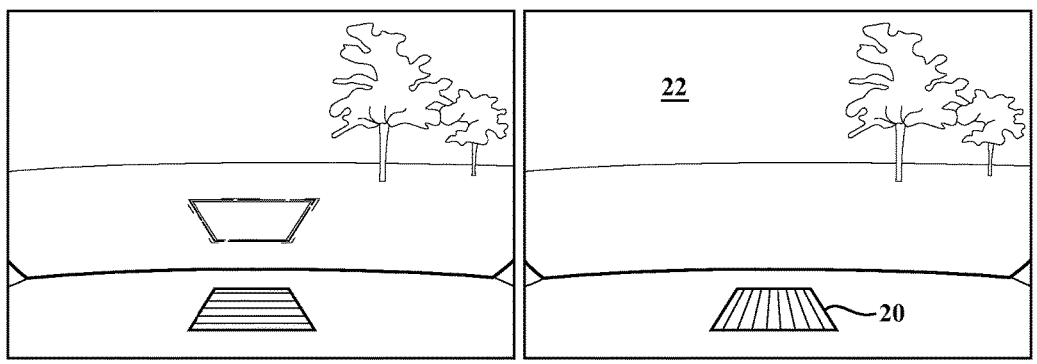
FIG. 10a is an illustration showing the WGP placed in the center of a dashboard of an automotive vehicle.
Figure 10B:
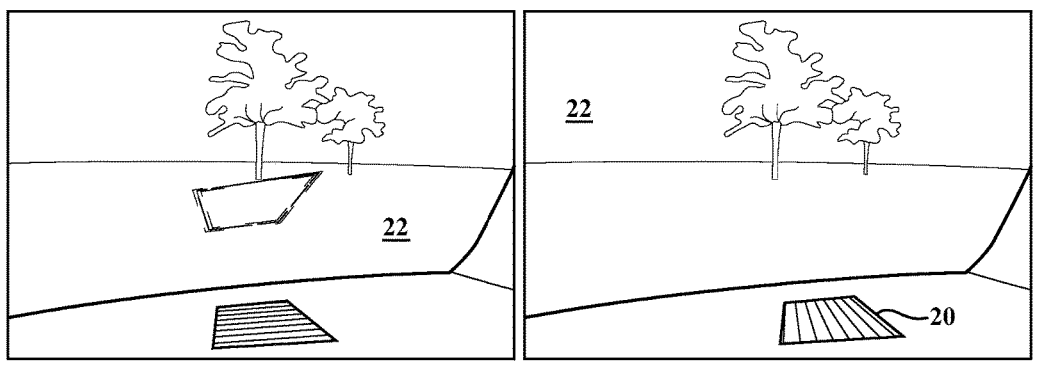
Figure 10C:
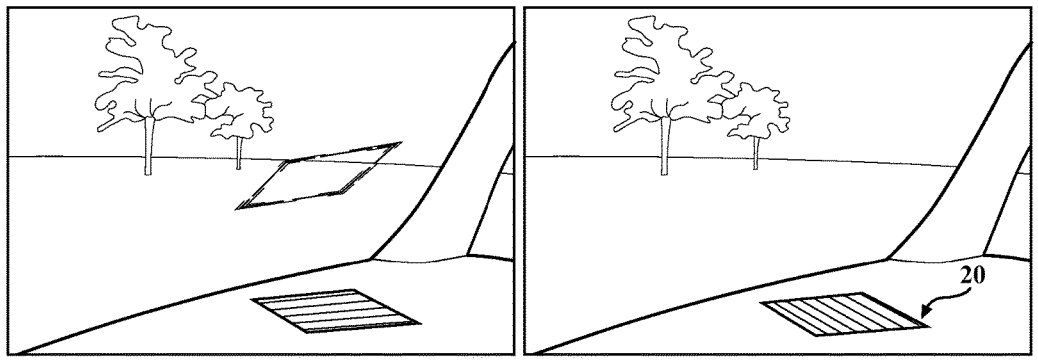
FIG. 10c is an illustration showing the WGP placed to the right of the WGP shown in FIG. 10b.

With reference now to FIGS. 10a, 10b and 10c, a physical test was conducted by placing the WGP 20 used in the model to generate the data shown in FIG. 9b. The WGP 20 is placed on various positions of the dashboard 12 of an automotive vehicle 14, and rotated at each position. The dashboard 12 has an absorption layer 18 underneath the WGP 20. FIGS. 10a, 10b and 10c demonstrate that the veiling glare may be influenced by the orientation of the longitudinal waveguides 28 with respect to the light source.

The WGP 20 in the right side images of FIGS. 10a, 10b and 10c have the longitudinal axis of the waveguides 28 aligned to the light source. That is, the longitudinal axis of the waveguides 28 are generally parallel to the length of the vehicle 14. The right side images of FIGS. 10a, 10b and 10c show that there is no veiling glare on the windshield 22 when the longitudinal axis of the waveguides 28 are parallel to the length of the vehicle 14. It should be further noted that the WGP 20 is positioned in different areas of the dashboard 12 in FIGS. 10a, 10b and 10c, and even so, there is no veiling glare.

With respect to the left side images of FIGS. 10a, 10b and 10c, the WGP 20 is positioned in the same spot as the WGP 20 in the right side of the same figure. However, the WGP 20 shown on the left side images are rotated 90 degrees with respect to the WGP 20 in the right side image. It can be observed that the angular orientation of the waveguides 28 affects the presence of the veiling glare.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination.

We claim:

1. A panel configured to reduce glare off an adjacent window, the panel comprising a substrate angled between 20 to 40 degrees relative to the adjacent window;

an absorption layer mounted on the substrate, wherein the absorption layer is configured to absorb S-polarized light and P-polarized light within a visible spectrum; and a wire-grid polarizer mounted on the absorption layer, the wire grid polarizer having a plurality of gratings formed of a metallic element, each of the gratings spaced apart from each other so as to form a waveguide, the metallic gratings having a sub-wavelength period and is configured to transmit S-polarized light and to reflect P-polarized light of all wavelengths in the visible spectrum so as to reduce veiling glare and maintain brightness of the substrate.

2. The panel as set forth in claim 1, further including a thin film layer disposed on each of the metallic gratings, the thin film layer configured to generate a resonance with the metallic gratings modifying the reflectivity of the wire grid polarizer to reflect said P-polarized light having a predetermined wavelength.

3. The panel as set forth in claim 2, wherein the thin film layer is formed of a resonance absorption material configured to reflect P-polarized light having a wavelength between 380 nm-750 nm.

4. The panel as set forth in claim 3, the thin film layer is a lossy dielectric.

5. The panel as set forth in claim 3, wherein the thin film layer is a semiconductor.

6. The panel as set forth in claim 5, wherein the semiconductor is one selected from the group consisting of amorphous silicon, germanium, zinc selenide, and zinc sulfide.

7. The panel as set forth in claim 3, wherein a thickness of the thin film layer is between 1 and 30 nanometers.

8. The panel as set forth in claim 1, wherein the waveguide has a width shorter than half of a wavelength of a predetermined hue.

9. The panel as set forth in claim 1, wherein the metallic element is one selected from the group consisting of aluminum, chromium, copper, silver, gold, platinum, zinc, and tungsten.

10. The panel as set forth in claim 1, wherein the each of the gratings has a thickness, the thickness being less than a wavelength of a predetermined hue.

11. The panel as set forth in claim 1, wherein a width of each of the gratings in the plurality of gratings is between 30-150 nm.

12. The panel as set forth in claim 1, wherein the panel is a dashboard of an automotive vehicle.

* * * * *